No. 740,164. PATENTED SEPT. 29, 1903.
M. R. MURRAY.
HORSESHOE CALK.
APPLICATION FILED JUNE 4, 1903.
NO MODEL.
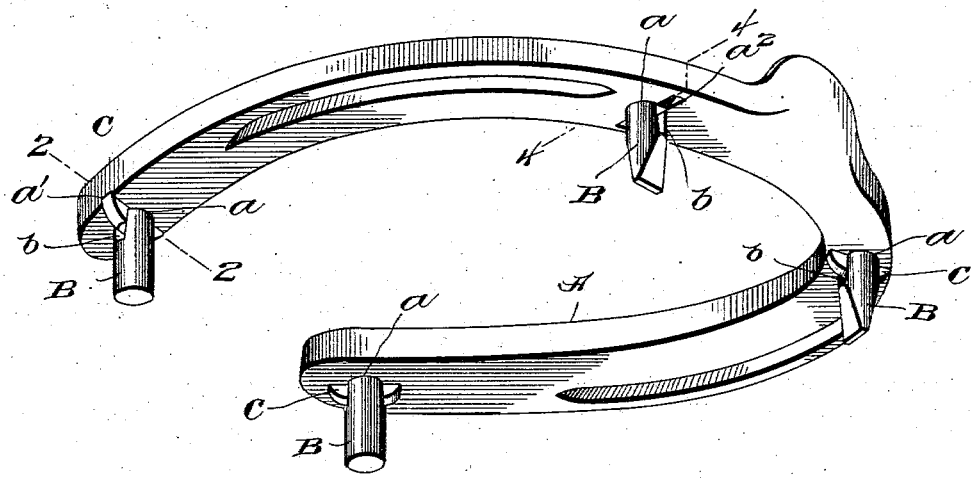
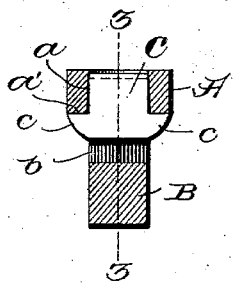
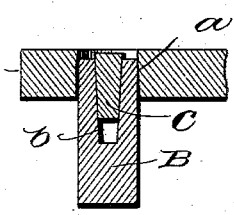
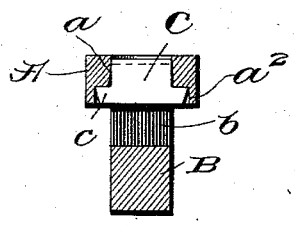
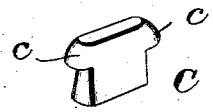
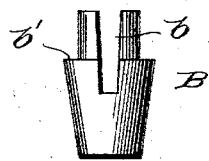
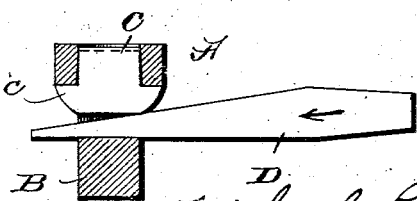
Witnesses
T. L. Mochrie
L. E. Witham.
Inventor
Michael R. Murray
By Alexander & Dowell
Attorneys No. 740,164. Patented September 29, 1903.

UNITED STATES PATENT OFFICE.

MICHAEL R. MURRAY, OF CAMBRIDGE, NEW YORK, ASSIGNOR OF ONE-HALF TO ROBERT H. WATKINS, OF CAMBRIDGE, NEW YORK, AND WILLIAM HAGEN, OF TROY, NEW YORK.

HORSESHOE-CALK.

SPECIFICATION forming part of Letters Patent No. 740,164, dated September 29, 1903.

Application filed June 4, 1903. Serial No. 160,126. (No model.)

*To all whom it may concern:*

Be it known that I, MICHAEL R. MURRAY, of Cambridge, in the county of Washington and State of New York, have invented certain new and useful Improvements in Horseshoe-Calks; and I hereby declare that the following is a full, clear, and exact description thereof, reference being had to the accompanying drawings, which form part of this specification.

This invention is an improvement in horseshoes; and its object is to provide horseshoes with easily attachable and detachable calks without requiring an expensive construction of shoe or calks nor an expert horseshoer or mechanic to attach or detach the calks, and the shoes may be shaped up and fitted to the horse's hoofs like ordinary shoes without injury to the calks or their means of connection to the shoes.

The well-known object of providing a shoe with calks is to prevent the animal slipping on ice or snow and to enable the animal to securely maintain its footing with ease.

In my invention no special form or construction of horseshoe is required, the calks are small and light while amply strong, do not interfere with or prevent the alteration of the shoe if after the calks are applied thereto it be necessary to alter its shape or to forge up toe or heel pieces on the shoe. Moreover, the calks can be pointed, chisel-shaped, rounded, or flattened on their ends, as may be desired, without interfering with their capability of attachment to and removal from the shoes. The fastenings are such that the calk is held positively and securely and cannot work loose or drop out nor can they become jammed, so as to prevent their removal. The calks can be attached and detached without special tools and without loosening or removing the shoes from the animal's hoof, and worn or broken calks can be readily replaced.

The invention therefore consists in the novel construction of the calks and attaching devices as summarized in the claims, and the accompanying drawings illustrate the invention clearly, and I will now describe the same with reference to said drawings, in which—

Figure 1 is a perspective bottom view of a horseshoe equipped with a set of my improved calks. Fig. 2 is a transverse vertical section through the shoe and calk on line 2 2, Fig. 1; Fig. 3, a section on line 3 3, Fig. 2. Fig. 4 is a section on line 4 4, Fig. 1. Fig. 5 is a view of one of the coacting wedges detached. Figs. 6 and 7 are detail views illustrating modifications of the calk. Fig. 8 is a detail view showing the means for and manner of detaching calks from a shoe.

The horseshoe A may be of any kind in common use or of any special construction desired, the only alteration in the shoe being forming therein vertical holes $a$ at the points where it is desired to attach the calks in case it be necessary or desirable to use them. Four holes are shown in the shoe illustrated in Fig. 1, said holes being located at proper points. These holes may be cylindrical or slightly tapered, and in the example shown the outer or bottom ends of the holes are slightly larger than the inner or top ends thereof to facilitate the entrance of the shanks of the calks and cause them to wedge tightly therein as they are forced upward by pressure on the shoe. The calks B are provided with shanks of approximately the diameter of the smaller end of the holes $a$, so that they can be inserted therein and will wedge or bind tightly therein as they are driven in, not sufficiently, however, to prevent their being driven home. These shanks of the calks, moreover, are longitudinally slotted, as at $b$, said slots being adapted to fit over spreading wedges C, which are first placed in the holes $a$, so as to extend diametrically across the same and axially thereof, said wedges being provided with wings or lugs $c$ on their lower ends, which impinge against the lower surface of the shoe and prevent the wedges being driven in with the shanks of the calks. Consequently the wedges spread the bifurcations of the shanks apart and cause them to bind tightly in the holes, as indicated in the drawings, and the more the calks are driven or pressed upward or inward the tighter they bind in the holes, and every time the animal's foot comes down the calks will be forced upward, so that there is no danger of their loosening.

The parts are so proportioned that the calk-shanks will be absolutely bound in the holes before they can possibly project through the shoe, and the slots $b$ are so deep that the wedges can never reach the bottoms thereof, leaving room for the insertion of the point of the calk-removing tool or wedge, hereinafter referred to.

The wings $c$ of the wedges C can rest on the lower surface of the shoe, or, if desired, the shoe may be transversely grooved or scored, as at $a'$, for the accommodation of the wedge-wings, which will prevent the calks and wedges turning in the holes, and this construction will be specially useful when chisel-pointed calks are used or any peculiar formation of calk-bodies which should remain in one position relative to the surface of the shoe, or the wings $c$ of the wedges may be entirely concealed in recesses $a^2$ in the lower surface of the shoe, these several constructions being indicated in Fig. 1. The slot $b$ in the calks may be straight or slightly tapered, but not tapered so much as the wedge. The projecting lower ends or heads of the calks may be of any desired kind. In Fig. 1 the toe-calks are shown pointed or chisel-shaped, while the heel-calks are shown flattened. The calk-heads may be of any desired form or shape, the invention residing in the fastening means rather than in the shape of the calk-heads. It will be observed that the wedges are of such size that they cannot project above the top of shoe at any time, so will not injure the animal's hoof. When the head of the calk is larger than the shank, it may form a shoulder, as indicated at $b'$ in Fig. 7, which will protect the wings of the wedge and also prevent the calk-shank by any possibility being driven too far upward. The slots $b$ are preferably of such depth that the wedge cannot entirely seat therein, and this facilitates the removal of the calks whenever it is desirable to do so, all that is necessary being to insert the point of the wedge-shaped tool D (see Fig. 8) between the base of slot $b$ and the wedge and drive the tool inward until the calk-shank is forced out of the hole or socket, which operation can be readily done without removing the shoe from the hoof. Different kinds of calks can be kept for use on different surfaces—as, for example, sharp-pointed calks for ice and the flat-headed calks for merely "roughing" the shoes.

Having thus described my invention, what I therefore claim as new, and desire to secure by Letters Patent thereon, is—

1. In combination with a horseshoe having a vertical hole at the point for attachment of a calk; with a calk having a shank adapted to fit the hole, said shank being transversely and vertically slotted, and an inverted wedge extending across and within the hole, and provided with wings on its lower corners adapted to engage the under surface of the shoe and prevent the wedge rising in the hole, said wedge engaging the slot in the shank, and spreading it in the hole and being retained in place by the shank and its wings, the calk being removed by forcing a tool into the slot under the wedge, substantially as described.

2. In combination, a horseshoe having calk-engaging holes; inverted wedges inserted in said holes and extending transversely across the same, said wedges being provided with wings on their lower ends to prevent uplifting of the wedge, and a calk having a shank adapted to enter the hole, said shank having a vertical transverse slot of greater depth than the wedge or hole, the wedge partly filling the slot when the shank is driven inward, but not reaching the bottom of the slot, for the purpose and substantially as described.

3. In combination, a shoe having a calk-engaging hole, and diametrically opposite recesses at the lower end of the hole communicating therewith, with a calk having a shank adapted to enter the hole, said shank having a transverse vertical slot of greater depth than the hole, and an inverted wedge extending across and fitted within the hole, having wings on its lower end, fitted in the opposite recesses, the slot of the shank engaging the wedge whereby the shank is tightly spread in the hole and a space left between the bottom of wedge and bottom of slot for the insertion of a calk-disengaging tool, substantially as described.

In testimony that I claim the foregoing as my own I affix my signature in presence of two witnesses.

MICHAEL R. MURRAY.

In presence of—
ALFRED G. HILL,
H. H. PARRISH.